United States Patent [19]

Yamaguchi et al.

[11] Patent Number: 5,377,054
[45] Date of Patent: Dec. 27, 1994

[54] DIGITAL INFORMATION REPRODUCING APPARATUS

[75] Inventors: Takeshi Yamaguchi, Sakai; Hiroshi Fuji, Nara, both of Japan

[73] Assignee: Sharp Kabushiki Kaisha, Osaka, Japan

[21] Appl. No.: 86,625

[22] Filed: Jul. 2, 1993

[30] Foreign Application Priority Data

Jul. 6, 1992 [JP] Japan .................................. 4-178135

[51] Int. Cl.⁵ .......................... G11B 5/09; G11B 20/10; G11B 5/02; H04N 5/76
[52] U.S. Cl. ............................. 360/39; 360/59; 360/51; 369/59
[58] Field of Search ............... 360/45, 46, 59, 61, 360/64, 65; 369/48, 59, 110, 124

[56] References Cited

U.S. PATENT DOCUMENTS

| 4,914,398 | 4/1990 | Jove et al. ................. 328/167 |
| 5,210,518 | 5/1993 | Graham et al. .............. 340/310 R |

FOREIGN PATENT DOCUMENTS

| 58-46717 | 3/1983 | Japan . |
| 59-107410 | 6/1984 | Japan . |
| 59-215040 | 12/1984 | Japan . |
| 2062421A | 5/1981 | United Kingdom . |

OTHER PUBLICATIONS

Patent Abstracts of Japan vol. 11, No. 62-112230, published Oct. 27, 1987.
Patent Abstracts of Japan vol. 12, No. 62-237808, published Apr. 7, 1988.
Patent Abstracts of Japan vol. 10, No. 61-45470 Jul. 18, 1986.
Patent Abstracts of Japan vol. 9, No. 60-13362 Jun. 5, 1985.

*Primary Examiner*—Donald T. Hajec
*Assistant Examiner*—T. N. Forbus, Jr.
*Attorney, Agent, or Firm*—David G. Conlin; Robert F. O'Connell; Milton Oliver

[57] ABSTRACT

A digital information reproducing apparatus is arranged to have a first envelope detecting circuit, a second envelope detecting circuit, an operating unit, a comparator, and a switching circuit. The first envelope detecting circuit serves to detect a envelope on the positive side of the output of an equalizing circuit. The second envelope detecting circuit serves to detect a envelope on the negative side of the output of the equalizing circuit. The operating unit serves to produce a difference of the outputs of the envelope detecting circuits. The comparator serves to compare an output of the operating unit with a predetermined signal level. The switching circuit serves to reduce a time constant on which charges stored in a capacitor of each of the envelope detecting circuits are discharged, based on the output signal of this comparator.

10 Claims, 12 Drawing Sheets

A B C

D E

Ve

Vd

DIGITAL INFORMATION REPRODUCING APPARATUS

BACKGROUND OF THE INVENTION

1. Field of the Invention

The present invention relates to a digital information reproducing apparatus such as a magneto-optical disk reproducing apparatus.

2. Description of the Related Art

In a digital information storing apparatus for recording and reproducing or just reproducing digital information along tracks on a recording medium included in an optical disk unit, a magnetic disk unit and a magnetic tape unit, an amplitude detection or a peak detection is carried out for the purpose of converting a reproduction signal output from a reproduction head into a digital binary signal.

For example, the optical disk unit employs an amplitude detecting system or a peak detecting system according to a recording system of the digital data. The amplitude detecting system and the peak detecting system respectively correspond to an NRZI system and a RZ system. In the NRZI system, the information to be detected is a front edge and a rear edge of a recorded mark.

Hence, the reproduction signal is converted into a digital signal by binary-comparing the reproduction signal with a proper threshold value. In the RZ system, the center of a recorded mark is information to be detected. It is, therefore, necessary to differentiate the reproduction signal for seeking a zero cross point.

In this method, however, it is impossible to separate a signal pulse for the center of the recorded mark from a noise pulse generated on the noise of the reproduction signal. Under this method, a data error is more likely to take place. To overcome this shortcoming, even in a peak detecting system, it is necessary to detect an amplitude for distinguishing the signal from the noise according to the amplitude of the reproduction signal.

Herein, in the amplitude detecting system, it is necessary to transmit the reproduced waveform containing DC components. On the other hand, because of the problems such as low frequency variation due to reflectivity variation of a recording medium, occurrence of DC offset, and difficulty in arranging a wide-band amplifier, in a reproducing circuit system, it is necessary to take the steps of removing low frequency components from the reproduction signal and constantly controlling a threshold value of a comparator for converting the reproduction signal into a digital signal to be a center value of the reproduction signal according to the reproduction signal level. The prior art of such a reproduction circuit is shown in FIG. 13.

In FIG. 13, the reproduction signal converted into an electric signal through the effect of the reproduction head is amplified up to a proper amplitude level in an AC-coupled preamplifier 500 and then is guided to a low-pass filter 501. The low-pass filter 501 operates to remove unnecessary high-frequency components of the reproduction signal. The output of the low-pass filter 501 is guided to an equalizing circuit 502 for compensating for a restricted bandwidth caused according to resolution of the reproduction head. The output of the equalizing circuit 502 is guided to one input terminal of the comparator 503 and the first envelope detecting circuit 504 and the second envelope detecting circuit 505.

A first envelope detecting circuit 504 is provided for detecting a positive side envelope of the output of the equalizing circuit 502 and is arranged to have a diode 610, a resistor 611, a capacitor 612 and a buffer 613. A second envelope detecting circuit 505 is provided for detecting a negative side envelope of the output of the equalizing circuit 502 and is arranged to have a diode 620, a resistor 621, a capacitor 622 and a buffer 623.

The outputs of the envelope detecting circuits 504 and 505 are guided to an operating unit 506 in which the outputs are added to form one signal and then the resulting signal is subjected to filtering for removing a ripple. The output of the operating unit 506 is guided to the other input terminal of the comparator. According to the above arrangement, the reproduction signal is constantly controlled to keep the threshold value of the comparator for converting into a digital signal at the center of the reproduction signal according to the reproduction signal level.

In such a reproducing circuit, however, the envelope detecting circuit operates to follow even a disordered envelope of the reproduction signal caused by a minute defect on the recording medium. That is, the capacitors 612 and 622 store large charges corresponding to an amplitude of the reproduction signal obtained when the reproduction head passes along a minute defect, After it passes along the minute defect, the charges are discharged at a time constant defined by the combination of the capacitor 612 or 622 and the resistor 611 or 621. Hence, a considerably long time is taken in returning the charges to the original amplitude of the reproduction signal. During this period, it is impossible to obtain a proper threshold value for the reproduction signal level, thereby bringing about a reproduction data error. That is, even a minute defect causes the reproduction data error to be like a burst, thereby disadvantageously lowering reliability of the data.

SUMMARY OF THE INVENTION

It is therefore an object of the present invention to provide an digital information reproducing apparatus which reduces an adverse effect given by a disordered portion of an envelope resulting from a minute defect or the like.

In a first aspect of the invention, there is provided a digital information reproducing apparatus comprising: readout means for reproducing information recorded on tracks of a recording medium by scanning a track of the recording medium; a first envelope detecting circuit providing a time constant circuit and for detecting an envelope of one polarity contained in a reproduction signal sent from the readout means; a second envelope detecting circuit providing a time constant circuit and for detecting an envelope of the other polarity contained in the reproduction signal; an adding circuit for obtaining a sum signal of outputs of the first and second envelope detecting circuits; a first comparator for comparing the reproduction signal with the sum signal; a subtracting circuit for obtaining a difference signal between the outputs of the first and second envelope detecting circuits; a second comparator for comparing the difference signal with a signal of a predetermined level; and a switching circuit for switching time constants of the time constant circuits provided in the first and second envelope detecting circuits, based on an output signal of the second comparator.

According to a first aspect of the invention, when the reproduction head scans along the track, normally, by setting the threshold value of the second comparator to a larger level than the amplitude level of the reproduction signal obtained from an information-recorded part, the output of the second comparator is a signal corresponding to a disordered portion of a reproduction signal amplitude level (the disordered portion in which the amplitude level is larger than the normally obtained reproduction signal amplitude level) caused by a minute defect.

Based on the output signal of the second comparator, the switching circuit operates to reduce the time constant at which the charges stored in the capacitors of the first and the second envelope detecting circuits are discharged. After the reproduction head passes along the minute defective part, it takes less time to return the storage amount of the charges into the charges for the original amplitude of the reproduction signal.

In a second aspect of the invention, there is provided a digital information reproducing apparatus comprising: readout means for reproducing information recorded on tracks of a recording medium by scanning a track of the recording medium; a first envelope detecting circuit providing a time constant circuit and for detecting an envelope of one polarity contained in a reproduction signal sent from the readout means; a second envelope detecting circuit providing a time constant circuit and for detecting an envelope of the other polarity contained in the reproduction signal; an adding circuit for obtaining a sum signal of outputs of the first and second envelope detecting circuits; a comparator for comparing the reproduction signal with the sum signal; a subtracting circuit for obtaining a difference signal between the outputs of the first and second envelope detecting circuits; a differentiating circuit for differentiating the difference signal; a switching circuit for switching time constants of the time constant circuits provided in the first and second envelope detecting circuits, based on an output signal of the differentiating circuit.

According to a second aspect of the invention, the output of the differentiating circuit is a signal indicating an abrupt change of an amplitude level of the reproduction signal caused by a minute defect or the like. Based on the output signal of the differentiating circuit, the switching circuit operates to reduce the time constant at which the charges stored in the capacitors of the first and the second envelope detecting circuits are discharged. After the reproduction head passes along the minute defective part, it takes less time to return the storage amount of charges into the charges for the original amplitude of the reproduction signal.

In a third aspect of the invention, there is provided a digital information reproducing apparatus comprising: readout means for reproducing information recorded on tracks of a recording medium by scanning a track of the recording medium; a first envelope detecting circuit providing a time constant circuit and for detecting an envelope of one polarity contained in a reproduction signal sent from the readout means; a second envelope detecting circuit providing a time constant circuit and for detecting an envelope of the other polarity contained in the reproduction signal; an adding circuit for obtaining a sum signal of outputs of the first and second envelope detecting circuits; a first comparator for comparing the reproduction signal with the sum signal; a second comparator for comparing the sum signal with a signal of a predetermined level; and a switching circuit for switching time constants of tile time constant circuits provided in the first and second envelope detecting circuits, based on an output signal of the second comparator.

According to a third aspect of the invention, when the reproduction head scans along the tracks, normally, by setting the threshold value of the second comparator to a larger level than the variation of the envelope of the reproduction signal obtained by the information recorded part, the output of the second comparator is a signal for a disordered portion (in which the amplitude level is larger than the normally obtained reproduction signal amplitude level) of an envelope of the reproduction signal caused by a minute defect or the like.

Based on the output signal of the second comparator, the switching circuit operates to reduce a time constant at which the charges stored in the capacitors of the first and the second envelope detecting circuits are discharged. After the reproduction head passes along the minute defective part, it takes less time to return the storage amount of charges into the charges for the original amplitude of the reproduction signal.

In a fourth aspect of the invention, there is provided a digital information reproducing apparatus comprising: readout means for reproducing information recorded on tracks of a recording medium by scanning a track of the recording medium; a first envelope detecting circuit providing a time constant circuit and for detecting an envelope of one polarity contained in a reproduction signal sent from the readout means; a second envelope detecting circuit providing a time constant circuit and for detecting an envelope of the other polarity contained in the reproduction signal; an adding circuit for obtaining a sum signal of outputs of the first and second envelope detecting circuits; a comparator for comparing the reproduction signal with the sum signal; a differentiating circuit for differentiating the sum signal; and a switching circuit for switching time constants of the time constant circuits provided in the first and second envelope detecting circuits, based on an output signal of the differentiating circuit.

According to a fourth aspect of the invention, the output of the differentiating circuit is a signal indicating an abrupt change of an envelope of the reproduction signal caused by the minute defect or the like. Based on the output signal of this differentiating circuit, the switching circuit operates to reduce the time constant at which the charges stored in the capacitors of the first and the second envelope detecting circuits are discharged. After the reproduction head passes along the minute defective part, it takes less time to return the storage amount of charges into the charges for the original amplitude of the reproduction signal.

Further objects and advantages of the present invention will be apparent from the following description of the preferred embodiments of the invention as illustrated in the accompanying drawings.

DESCRIPTION OF THE PREFERRED EMBODIMENT

Figure 1:
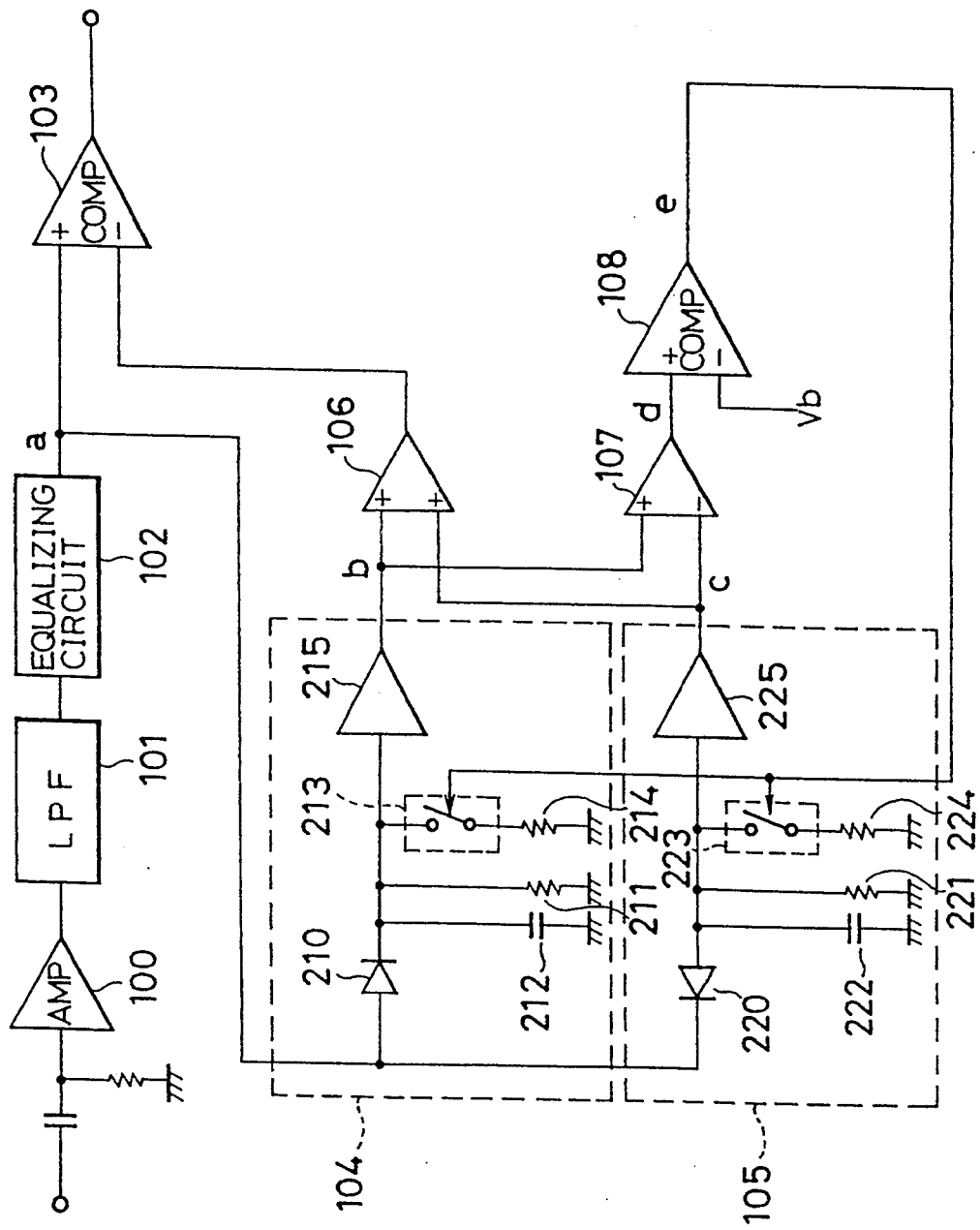
FIG. 1 is an electric circuit diagram showing a digital information reproducing apparatus according to a first embodiment of the present invention.

The description will be directed to a first embodiment of the present invention as referring to the drawings.

FIG. 1 is a block diagram showing an arrangement of a reproducing circuit of this invention. As shown in FIG. 1, a reproduction signal converted into an electric signal by a reproduction head is amplified by an AC-coupled pre-amplifier 100 and then is guided to a low-pass filter 101. The output of the low-pass filter 101 is guided to an equalizing circuit 103 in which the waveform-equalizing treatment is carried out with respect to the output.

The output of the equalizing circuit 102 is guided to one input terminal of a first comparator 103 as well as a first envelope detecting circuit 104 and a second envelope detecting circuit 105. The first envelope detecting circuit 104 for detecting an envelope on the positive side of the output of the equalizing circuit 102 is arranged of a diode 210, a resistor 211, a capacitor 212, an analog switch 213, a resistor 214 and a buffer amplifier 215.

The second envelope detecting circuit 105 for detecting an envelope on the negative side of the output of the equalizing circuit 102 is arranged of a diode 220, a resistor 221, a capacitor 222, an analog switch 223, a resistor 224 and a buffer amplifier 225. The outputs of the first and the second envelope detecting circuits 104 and 105 are guided to an operating unit 106 in which these outputs are added. The added signal is filtered for removing a ripple. The output of the operating unit 106 is guided to the other input terminal of the comparator 103. The outputs of the envelope detecting circuits 104 and 105 are guided to an operating unit 107 in which a difference between these outputs are derived. The output of the operating unit 107 is guided to one input terminal of a second comparator 108. The other input terminal of the comparator is kept at a predetermined potential $V_b$. The output of the comparator 108 is connected to the control input terminals of the analog switches 213 and 223.

The operation of the above-mentioned arrangement will be discussed below as referring to the waveforms shown in FIG. 2. Herein, the analog switches 213 and 223 are normally made open and the resistors have the relations of resistor 211 > resistor 214 and resistor 221 > resistor 224.

Figure 2A:
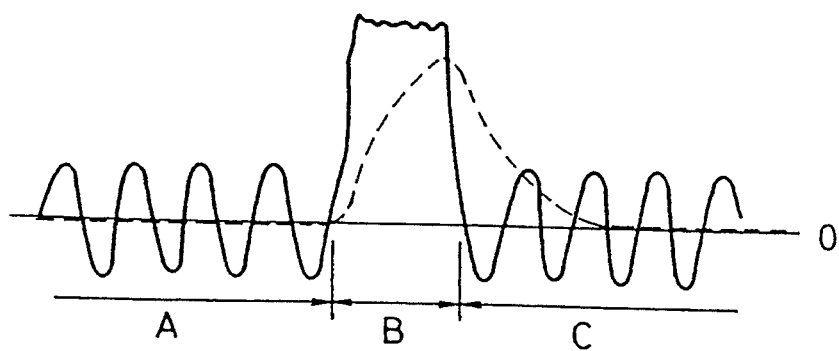
FIG. 2a–e depict waveforms for explaining an operation of the first embodiment.

A real line of FIG. 2a indicates an output signal of the equalizing circuit 102. The amplitude of the signal is amplified up to a proper level so that the high-pass noise components are removed from the signal through the effect of the pre-amplifier 100 at the previous stage, the low-pass filter 101 and the equalizing circuit 102. Further, the degradation of the frequency characteristic resulting from the reproduction head is compensated by these components.

In FIG. 2, the periods A and C indicate normal states in which no disorder caused by a defect takes place in an envelope. The period B indicates a portion in which the amplitude of the reproduction signal is swung too much by means of a minute defect existing on the disk.

Figure 2B:
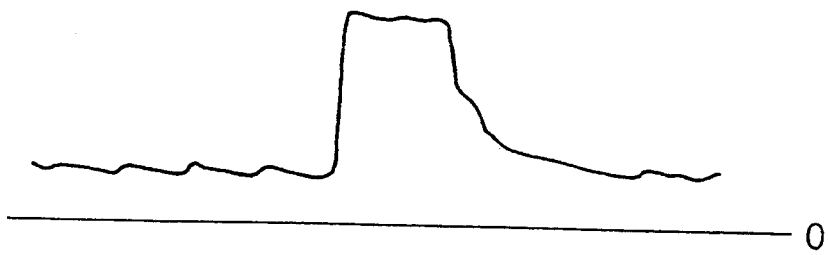
Figure 2C:
Figure 2D:
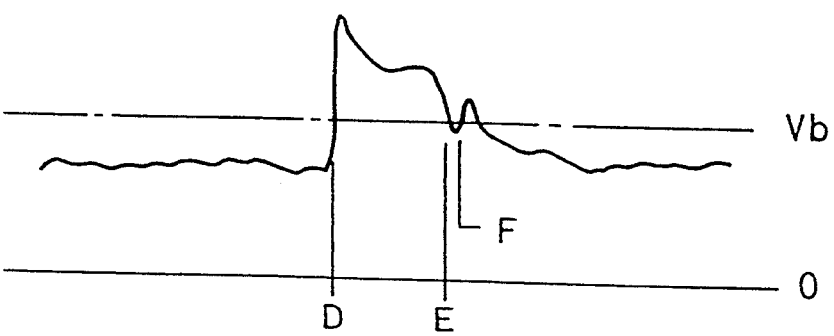
Figure 2E:
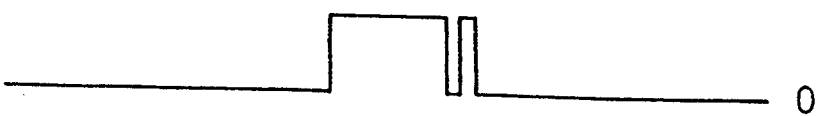

The output signals of the first and the second envelope detecting circuits 104 and 105 for such a reproduction signal are indicated by FIG. 2b and FIG. 2c, respectively. Further, the output signal of the operating unit 107 is indicated by FIG. 2d and the output signal of the comparator 108 is indicated by FIG. 2e. In FIG. 2a, for the portion A, the storage of charges in the capacitor 212 (222) of the envelope detecting circuit 104 (105) is performed by the diode 210 (220). The charges are discharged through the resistor 211 (221). The time constant on which the charges are discharged is defined by the resistor 211 (221) and the capacitor 212 (222) and is normally set to a far larger value than the repeating period of the reproduction signal (output signals (b) and (c)).

For the leading edge portion of the succeeding period B corresponding to a minute defect, as indicated by the output signal FIG. 2b, the output signal of the first envelope detecting circuit 104 abruptly rises. Hence, the output signal of the operating unit 107 is higher than the potential $V_b$ as shown by the output signal FIG. 2d (D of FIG. 2).

At this time, the output signal of the comparator 108 is at high level. Since the output signal of the comparator 108 is at high level, the analog switches 213 and 223 are made closed and the charges stored in the capacitor 212 (222) are discharged through the resistors 211 and 214 (221 and 224). The time constant for this purpose is defined by (resistor 211) (resistor 214)/{(resistor 211)+[(resistor 214)} ((resistor 221) (resistor 224)/{(resistor 221)+(resistor 224)}) and the capacitor 2:12 (222). By setting the resistance of the resistor 214 (224) to a far smaller value than that of the resistor 211 (221), the time constant at which the charges are discharged from the capacitor 212 (222) when the analog switch 213 (223) is closed is sufficiently small and is substantially defined by the resistor 214 (224) and the capacitor 212 (222).

In this embodiment, it is observed that an envelope peak appears on the positive polarity side of the reproduction signal, the output signal of the first envelope detecting circuit 104 represents the envelope with fidelity during the period when successive minute defects appear as indicated in the output signals FIG. 2b and FIG. 2c. On the other hand, the output signal of the second envelope detecting circuit 105 is returned to a zero potential based on the time constant defined by the resistor 224 and the capacitor 222. As stated above, the output signal of the operating unit 107 is as shown by the output signal FIG. 2d corresponding to the appearance of minute defects but keeps the potential $V_b$ or more. The output of the comparator 108 is maintained at high level (output signal (e)).

As shown in FIG. 2a, in the head portion of C where the original reproduction signal is obtained after the passage of the minute defective portion, the output signal of the first envelope detecting circuit 104 is started to return to the zero potential based on the time constant defined substantially by the resistor 214 and the capacitor 212. The output signal of the operating unit 107 lowers its signal level to the potential $V_b$ or less (E of FIG. 2).

At this time, the output signal of the comparator 108 is at low level. Since the output signal of the comparator 108 is at low level, the analog switches 213 and 223 are made open and the normal circuit state takes place where the charges stored in the capacitor 212 (222) are discharged through the resistor 211 (221).

In this embodiment, immediately after the passage of a minute defective portion, a peak on the negative polarity side appears. Hence, as indicated by F of FIG. 2, the output signal of the operating unit 107 goes up to the potential $V_b$ or higher again. The analog switches 213 and 223 are made closed, so that the time constant on which the charges stored in the capacitor 212 (223) are discharged becomes smaller. Finally, at the amplitude level of the normal reproduction signal, the analog switches 213 and 223 are toggled from an open state to a closed state or vice versa until the output signal of the operating unit 107 does not reach the potential $V_b$ or higher.

In accordance with the foregoing operation of the circuit components, the output signal of the operating unit 106 is as shown by a broken line of FIG. 2a and quickly follows the normal reproduction signal after the passage of the minute defective portion.

The second embodiment of the present invention will be discussed as referring to the drawings.

Figure 3:
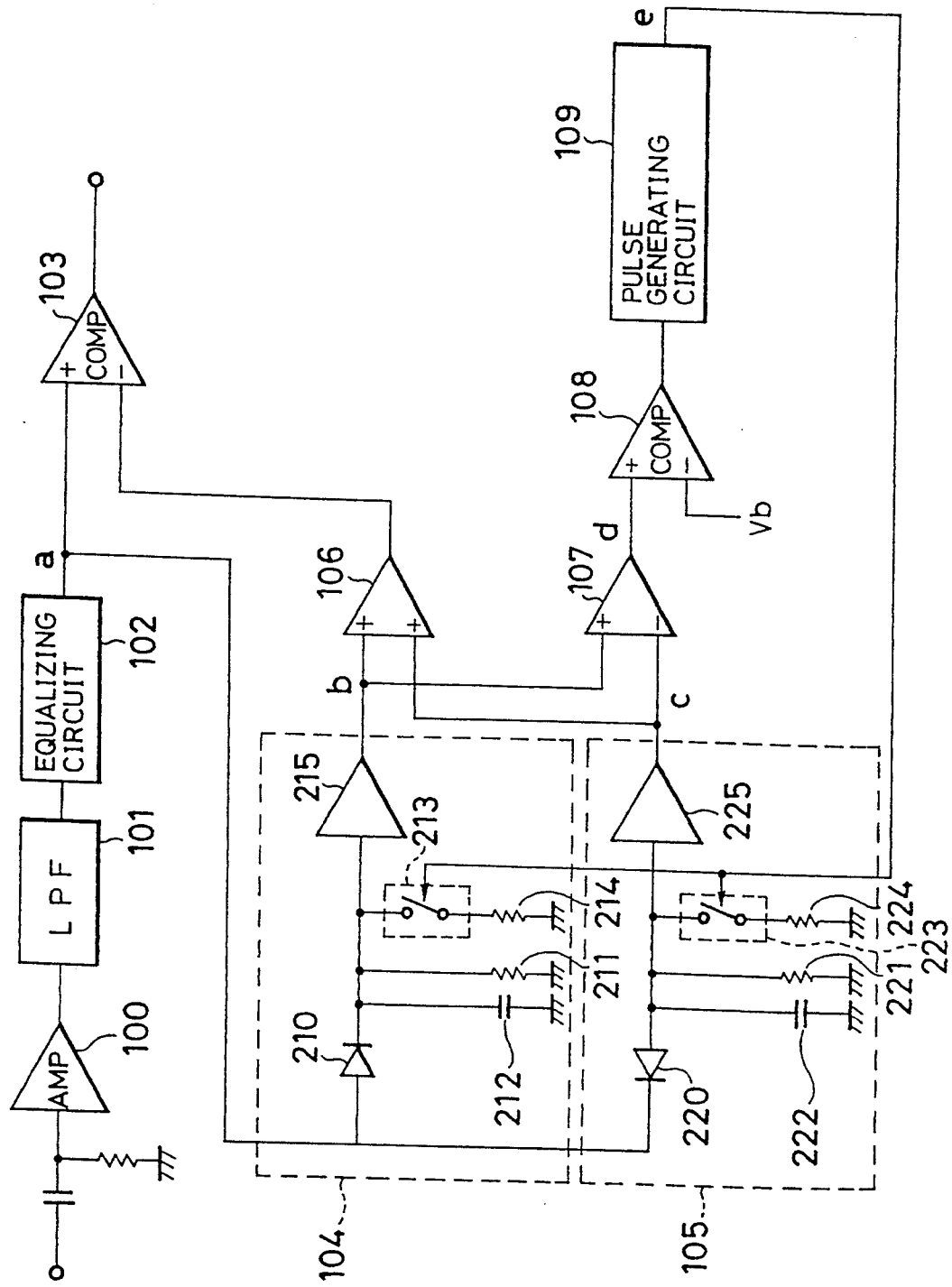
FIG. 3 is an electric circuit diagram showing a digital information reproducing apparatus according to the second embodiment of the present invention.
Figure 11:
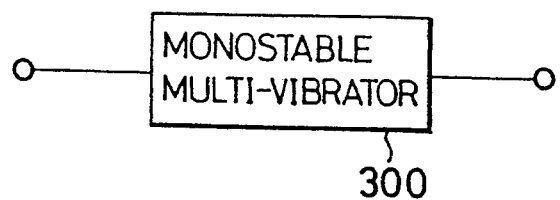
FIG. 11 is an electric circuit block diagram showing a concrete circuit of a pulse generating circuit included in the second embodiment.

FIG. 3 is a block diagram showing a reproducing circuit according to the second embodiment of the present invention. The same components as those shown in FIG. 1 have the same reference numbers. In this embodiment, based on the output signal of the comparator 108, a pulse generating circuit 109 is newly provided for generating a control signal for opening or closing the analog switches 213 and 223. The concrete arrangement of the pulse generating circuit 109 has as a component a retriger-able and monostable multi-vibrator 300 which operates at the leading portion of the input signal as shown in FIG. 11.

The operation of the foregoing arrangement will be discussed below as referring to FIG. 4.

Herein, it is assumed that the analog switches 213 and 223 are normally made open and the resistors have the relations of resistor 211 > resistor 214 and resistor 221 > resistor 224.

Figure 4A:
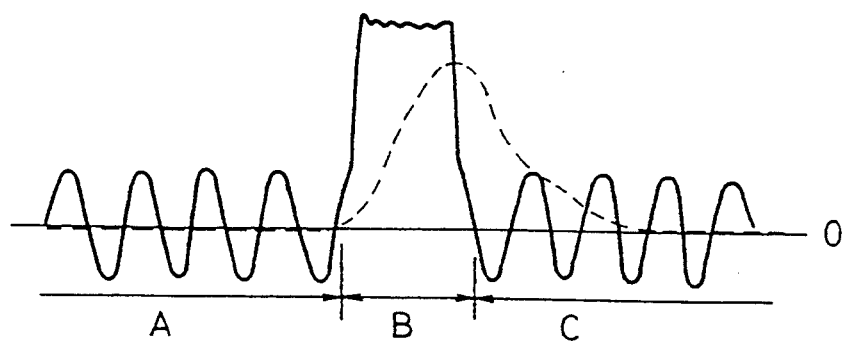
FIG. 4a–e depict waveforms for explaining the operation of the second embodiment.
Figure 4B:
Figure 4C:
Figure 4D:
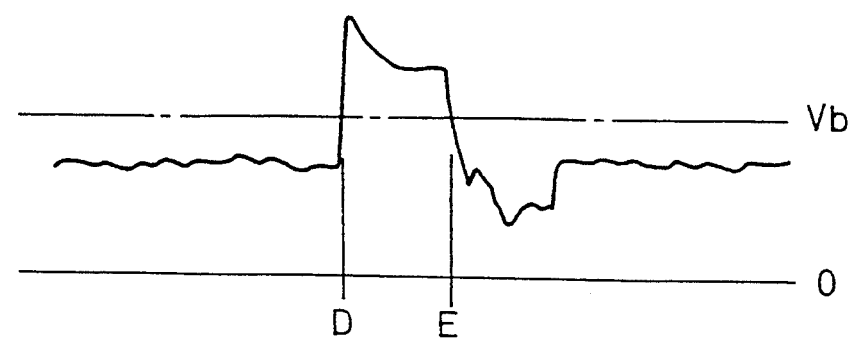
Figure 4E:
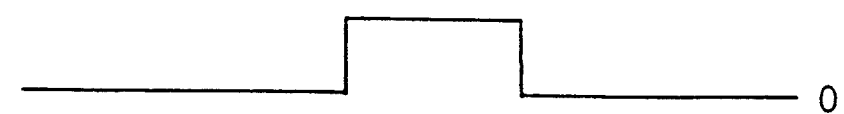

A real line indicated by FIG. 4a indicates the output signal of the equalizing circuit 102. This is true to the real line of FIG. 2a. With respect to this kind of reproduction signal, the output signals of the first and the second envelope detecting circuits 104 and 105 are indicated by FIG. 4b and FIG. 4c respectively. The output signal of the operating unit 107 is indicated by FIG. 4d and the output of the pulse generating circuit 109 is indicated by FIG. 4e.

In the A portion of FIG. 4a, the operations of the envelope detecting circuits 104 and 105 are analogous to those in the embodiment shown in FIGS. 1 and 2 (output signals (b) and (c)).

In the leading edge of the B period for the successive minute defect, as indicated by the output signal FIG. 4b, the output signal of the first envelope detecting circuit 104 indicates an abrupt rise. Hence, the output signal of the operating unit 107 is kept at the potential $V_b$ or more as indicated by FIG. 4d (D of FIG. 4).

At this time, the output signal of the comparator 108 goes up to a high level so that the pulse generating circuit 109 may output a pulse signal having a predetermined time width (output signal (e)). While the output signal of the pulse generating circuit 109 is at high level, the analog switches 213 and 223 are made closed so that the charges stored in the capacitor 212 (222) are discharged through the resistors 211 and 214 (221 and 224). Herein, by setting the resistance of the resistor 124 (224) to a far smaller value than that of the resistor 211 (221), like the foregoing embodiment, the time constant on which the charges are discharged from the capacitor 212 (222) in the closed state of the analog switches 213 and 223.

Assuming that the width of a pulse output from the pulse generating circuit 109 is set to a larger value than a length of time for a minute defect, at the head portion of C for obtaining the original reproduction signal after the passage of a minute defective portion, the output signal (b) of the first envelope detecting circuit 104 starts to return to a zero potential with a small time constant. The output signal (d) of the operating unit 107 lowers the signal level to the potential $V_b$ or less (E of FIG. 4). Then, while the output signal of the pulse generating circuit is kept at high level, the output signal of the operating unit 107 follows the reproduction signal.

By shifting the output signal (e) of the pulse generating circuit 10g to a low level, the analog switches 213 and 223 are made open, so that the overall circuit may enter into the normal state. According to the operations of the above circuit components, the output signal of the operating unit 106 is as indicated by a broken line of FIG. 4a and swiftly follows the normal reproduction signal after the passage of a minute defective portion.

The third embodiment of the present invention will be discussed as referring to FIG. 5.

Figure 5:
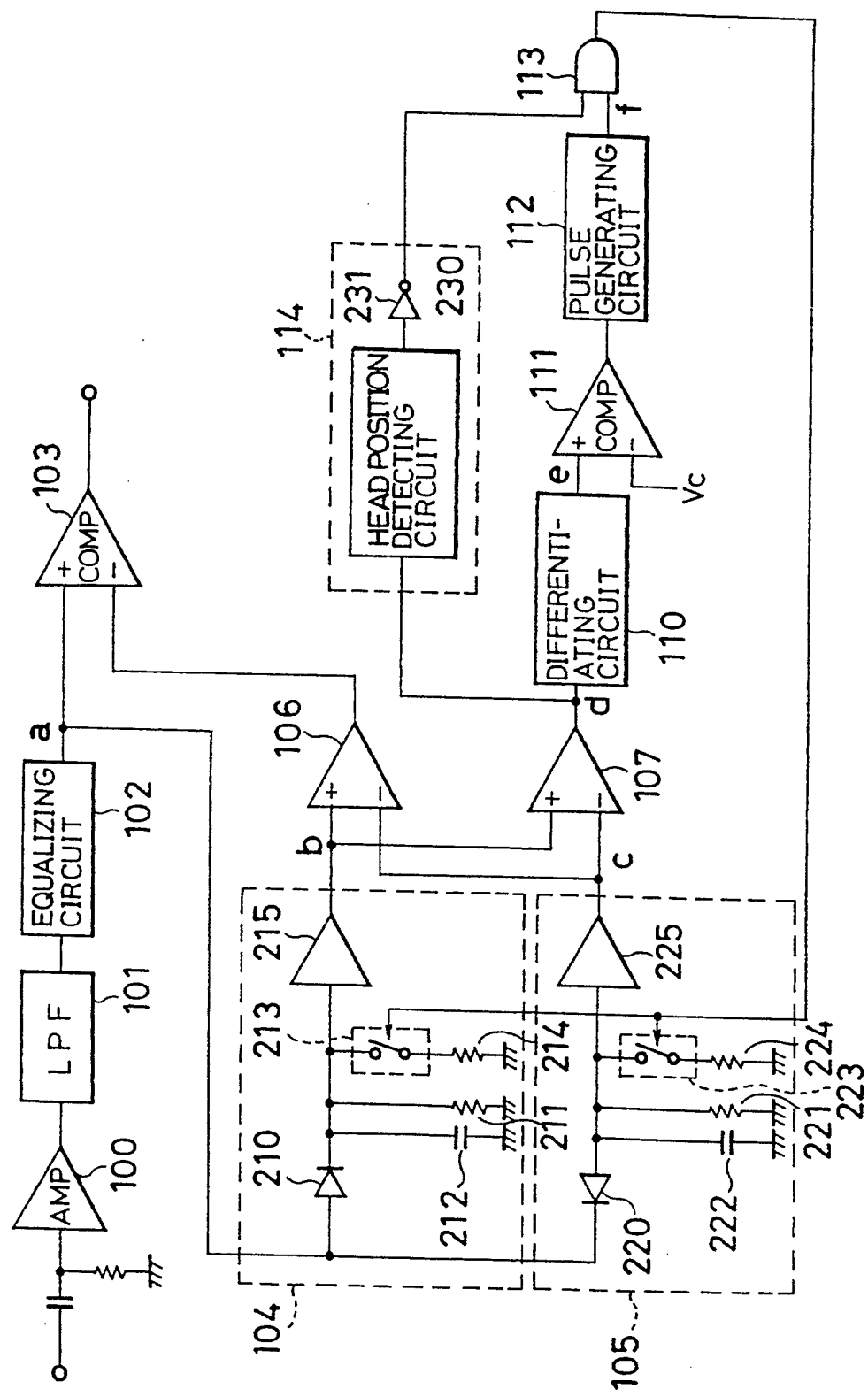
FIG. 5 is an electric circuit diagram showing a digital information reproducing apparatus according to a third embodiment of the present invention.

FIG. 5 is a block diagram showing a reproducing circuit according to the third embodiment of the present invention. For the explanation's sake, the same components as those shown in FIGS. 1 and 3 have the same reference numbers. In this embodiment, the output of the operating unit 107 for operating a difference between the outputs of the envelope detecting circuits 104 and 105 is guided to the differentiating circuit 110 in which the output is differentiated. The output signal of the differentiating circuit 110 is guided to one input terminal of the second comparator 111. The other input terminal of the comparator 111 is kept at the potential $V_c$.

The output signal of the comparator 111 is guided to the pulse generating circuit 112. Based on the output signal of the comparator 111, the pulse generating circuit 112 serves to generate a control signal for opening and closing the analog switches 213 and 223. The output of the pulse generating circuit 112 passes through a gate circuit 113 in order to control the analog switches 213 and 223. The pulse generating circuit 112 may be arranged of a retriger-able and monostable multi-vibrator, for example, like the foregoing embodiment. A circuit block 114 indicated by a broken line of FIG. 5 operates to generate a control signal for masking an output signal of the pulse generating circuit 112.

In this arrangement, by differentiating the output signal of the operating unit 107, no adverse effect is brought about by the variation of the amplitude level of the reproduction signal. The variation of the amplitude level takes place due to variation between disks, environmental conditions like a temperature, and an uneven recording and reproducing characteristic of a disk.

The operation of the foregoing arrangement will be discussed as referring to a model view of FIG. 6. Herein, it is assumed that the analog switches 213 and 223 are normally made open, the resistors have the relations of resistor 211>resistor 214 and resistor 221>resistor 224 and the output of the circuit block 114 is normally maintained at high level.

Figure 6A:
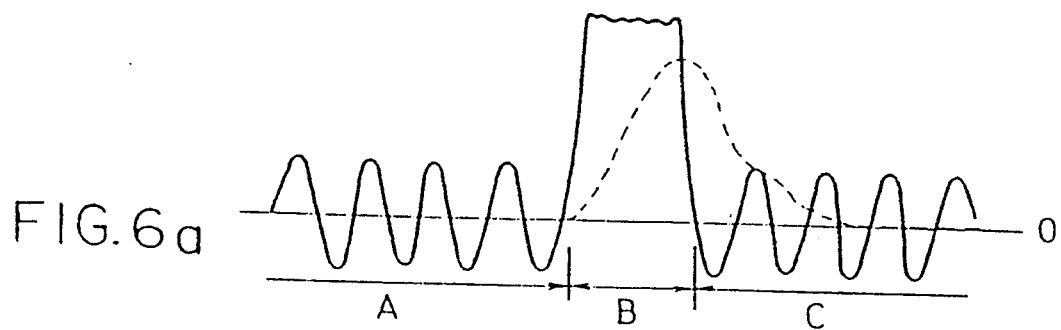
FIGS. 6a–f depict waveforms for explaining the operation of the third embodiment.
Figure 6B:
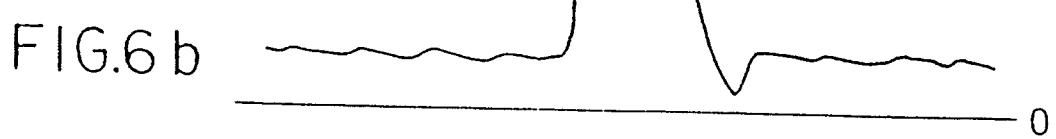
Figure 6C:
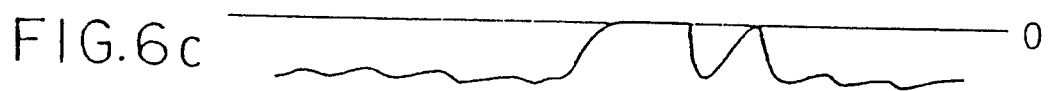
Figure 6D:
Figure 6E:
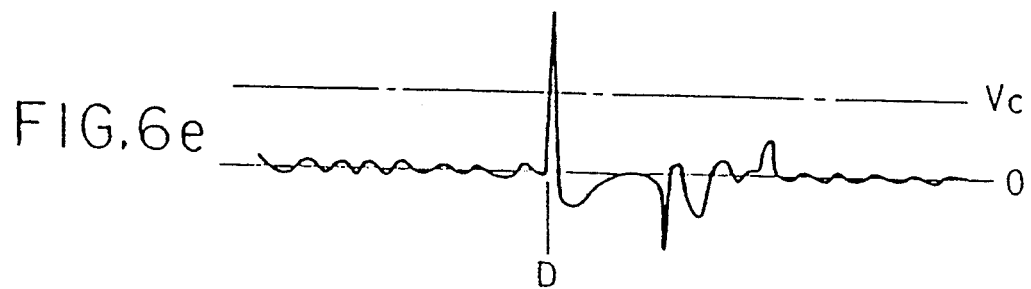
Figure 6F:
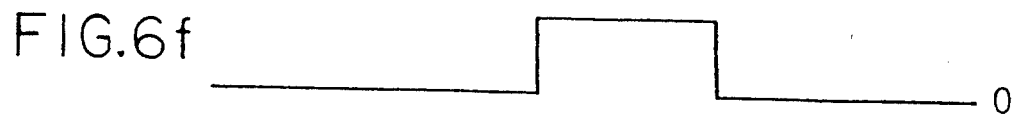

A real line of FIG. 6a indicates an output signal of the equalizing circuit 102. This is true to FIG. 2a. With respect to the reproduction signal, the output signals of the first envelope detecting circuit 104 and the second envelope detecting circuit 105 are indicated by FIG. 6b and FIG. 6c, respectively. The output signal of the operating unit 107 is indicated by FIG. 6d and the output signal of the differentiating circuit 110 is indicated by FIG. 6e. Further, the output signal of the pulse generating circuit 112 is indicated by FIG. 6f.

In the A portion of FIG. 6a, the operations of the envelope detecting circuits 104 and 105 are the same as those of the embodiment shown in FIGS. 1 and 2 (output signals (b) and (c)).

In the leading edge of the B period for the successive minute defect, as indicated by the output signal (FIG. 6b), the output signal of the first envelope detecting circuit 104 indicates an abrupt rise. According to the abrupt rise, the output signal of the operating unit 107 rises (output signal (d)). Hence, the differentiating circuit 110 operates to output a pulsewise signal as corresponding to the abrupt rise of the output signal of the operating unit 107 as indicated by an output signal (FIG. 6e). The signal level of the pulsewise signal is maintained at the potential $V_c$ or more (D of FIG. 6). At this time, the output signal of the comparator 111 rises to a high level and the pulse generating circuit 112 serves to output a pulse signal having a predetermined time width (output signal (f)).

While the output signal of the pulse generating circuit 112 is at high level, the analog switches 213 and 223 are made closed so that the charges stored in the capacitor 212 (222) are discharged through the resistors 211 and 214 (221 and 224). Herein, by setting the resistance of the resistor 214 (224) to a far smaller value than that of the resistor 211 (221), the time constant on which the charges of the capacitor 212 (222) are discharged in the closed state of the analog switches 213 and 223 is sufficiently small. This is the same as the foregoing embodiment.

Assuming that the width of the pulse output from the pulse generating circuit 112 is set to a larger value than a length of time for a minute defective portion, after the passage of the minute defective portion, at the head portion of C for obtaining an original reproduction signal, the output signal (b) of the first envelope detecting circuit 104 starts to return to a zero potential with a small time constant. The output signal (d) of the operating unit 107 lowers its signal level. Then, the output signal (d) of the operating unit 107 follows the reproduction signal while the output signal (f) of the pulse generating circuit 112 is kept at high level.

By shifting the output signal (f) of the pulse generating circuit 112 to a low level, the analog switches 213 and 223 are made open and thus the overall circuit may return to the normal state.

In a case that the optical disk reproducing apparatus employs a system of dividing the optical disk into a plurality of blocks along the information tracks and recording data for each of the blocks, the reproduction signal converted into an electric signal by the reproduction head is an intermittent signal in each block. If the reproduction signal is intermittent, at the head portion of the reproduction signal, the output signal (d) of the operating unit 107 abruptly rises so that the differentiating circuit 110 may output a pulsewise signal. If the output signal (e) of the differentiating circuit 110 goes up to a predetermined potential $V_c$ or higher, the output signal of the comparator 111 is shifted to a high level signal so that the pulse generating circuit 112 may output a pulse for closing the analog switches 213 and 223 even at the head portion of the reproduction signal.

Figure 12:
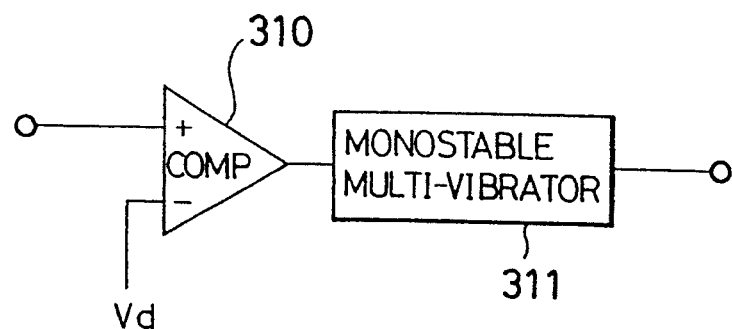
FIG. 12 is an electric circuit block diagram showing a head position detecting circuit included in the third to the fifth embodiments.
Figure 13:
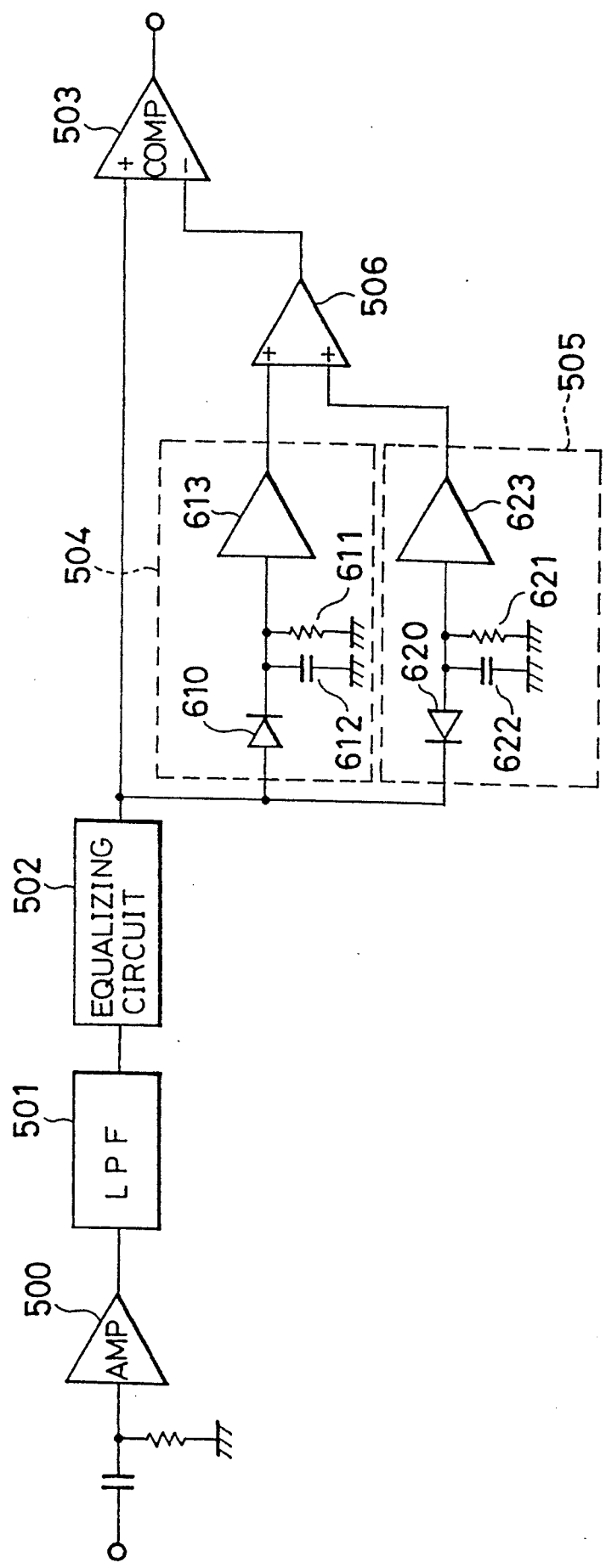
FIG. 13 is an electric circuit block diagram showing the conventional digital information reproducing apparatus.

A circuit block 114 indicated by a broken line of FIG. 5 serves to generate a control signal for removing a pulse signal output by the pulse generating circuit 112 at the head portion of the reproduction signal if the reproduction signal is intermittent. In this embodiment, a head position detecting circuit 230 and an inverter 231 are provided for receiving the output signal (d) of the operating unit 107 as its input and sensing the head portion of the intermittent reproduction signal and generating a pulse having a predetermined time width. The output signal of the inverter 231 is led to a gate circuit 113. The head position detecting circuit is, as shown in FIG. 12, arranged of a comparator 310 for comparing the output of the operating unit 107 with the predetermined potential $V_d$ and a monostable multi-vibrator 311 for generating a pulse having a predetermined width of time when the output signal of the comparator 310 is shifted to a high level signal.

In an optical disk reproducing apparatus which is operated to obtain a serial reproduction signal given while the reproduction head moves along the information tracks, the foregoing description clearly indicates that the circuit block 114 and the gate circuit 113 are not necessary.

According to the operations of the above circuit components, the output signal of the operating unit 106 is indicated by a broken line of FIG. 6a. After the passage of a minute defective portion, the output signal swiftly follows the normal reproduction signal.

The fourth embodiment of the present invention will be described as referring to the drawings.

Figure 7:
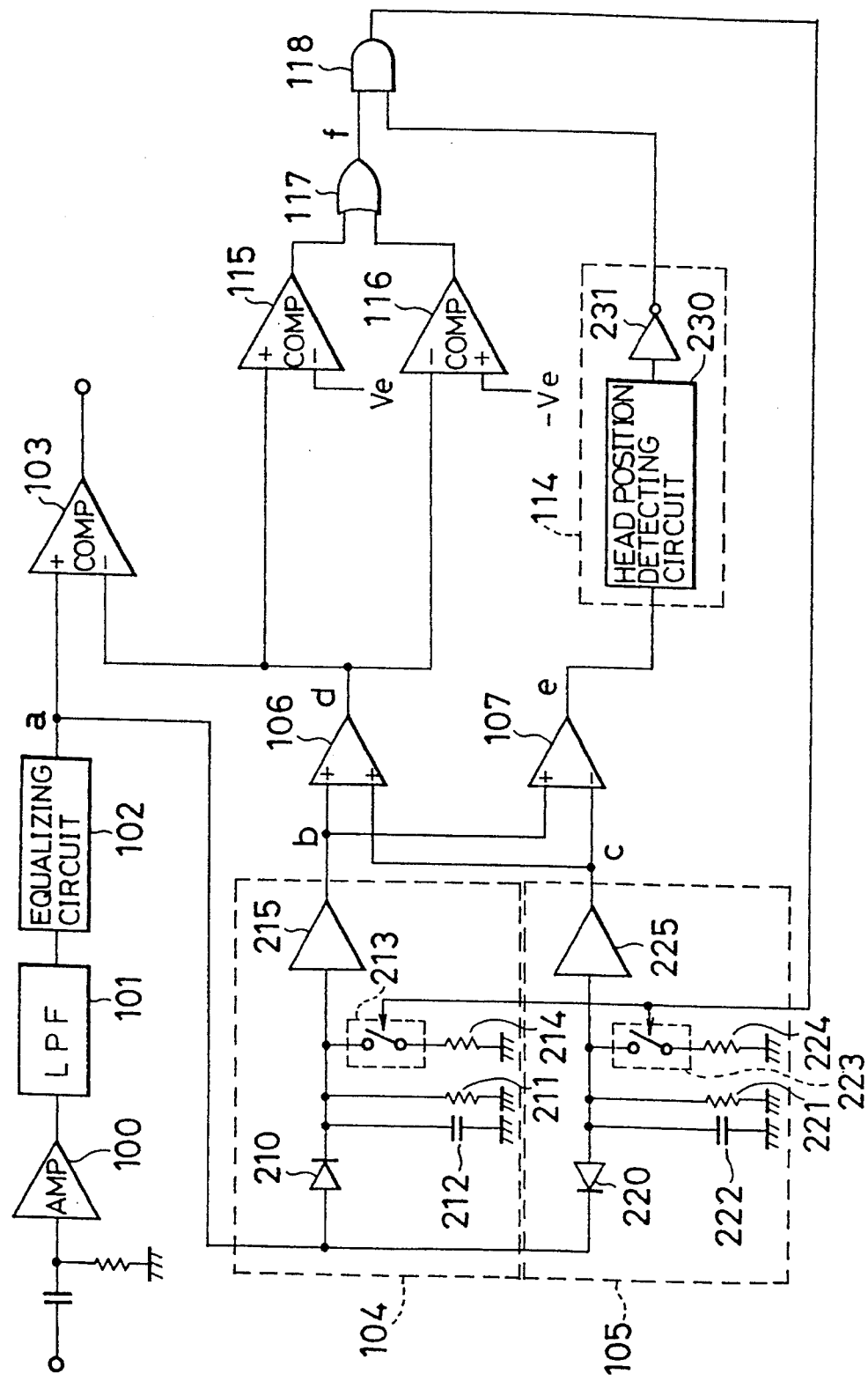
FIG. 7 is an electric circuit diagram showing a digital information reproducing apparatus according to a fourth embodiment of the present invention.

FIG. 7 is a block diagram showing a reproducing circuit included in an optical disk reproducing apparatus to which the present invention applies. The same components as those shown in FIGS. 1 and 5 have the same reference numbers. In this embodiment, the output signal of the operating unit 106 is guided to one input terminals of the comparator 103 as well as to the comparators 115 and 116. The other input terminals of the comparators 115 and 116 are maintained at the potentials $V_e$ and $-V_e$, respectively.

The output signals of the comparators 115 and 116 are made logical OR in a gate circuit 117. The signal made logical OR passes to the analog switches 213 and 223 through a gate circuit 118 for the purpose of opening and closing those switches. A circuit block 114 indicated by a broken line of FIG. 7 operates to generate a control signal for masking the output signal of the gate circuit 117.

In this arrangement, the peak portion of the output signal of the operating unit 106 which is input to the comparator 103 is directly detected for opening or closing the analog switches 213 and 223.

The operation of this arrangement will be described below as referring to FIG. 8. Herein, it is assumed that the analog switches 213 and 223 are normally made open and the resistors have the relations of resistor 211>resistor 214 and resistor 221>resistor 224 and the output of the circuit block 114 is normally kept at high level.

Figure 8A:
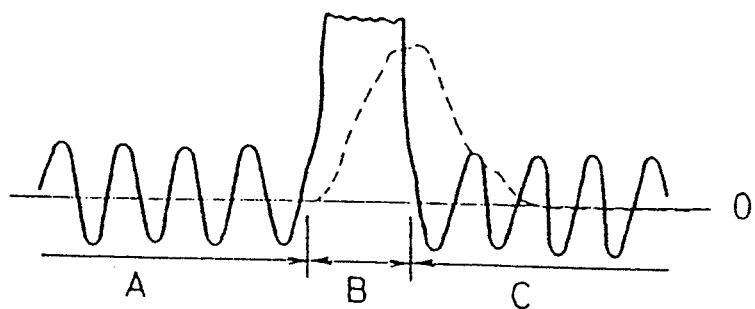
FIG. 8a–f depict waveforms for explaining the operation of the fourth embodiment.
Figure 8B:
Figure 8C:
Figure 8D:
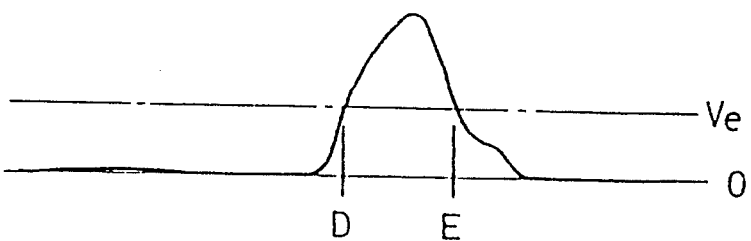
Figure 8E:
Figure 8F:
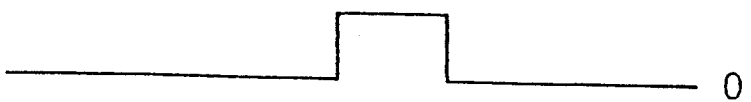

A real line indicated by FIG. 8a indicates an output signal of the equalizing circuit 102. This is the same as that shown in FIG. 2a. With respect to this kind of reproduction signal, the output signals of the first envelope detecting circuit 104 and the second envelope detecting circuit 105 are indicated by FIG. 8b and FIG. 8c, respectively. The output signals of the operating units 106 and 107 are indicated by FIG. 8d and FIG. 8e, respectively. The output signal of the gate circuit 117 is indicated by FIG. 8f.

In the A portion of FIG. 8a, the operations of the envelope detecting circuits 104 and 105 are analogous to those of the embodiments shown in FIGS. 1 and 2 (output signals (b) and (c)).

In the leading edge of the B period corresponding to the successive minute defect, as indicated by the output signal (b), the output signal (b) of the first envelope detecting circuit 104 indicates an abrupt rise. Hence, the output signal (d) of the operating unit 106 becomes an potential $V_e$ or higher (D of FIG. 8). At this time, the output signal of the comparator 115 rises to a high level. By shifting the output signal of the comparator 115 to the high level, the analog switches 213 and 223 are made closed through the effect of the gate circuits 117 and 118 so that the charges stored in the capacitor 212 (222) are discharged through the resistors 211 and 214 (221 and 224). Herein, by setting the resistance of the resistor 214 (224) to a far smaller value than that of the resistor 211 (221), like the foregoing embodiment, the time constant on which the charges of the capacitor 212 (222) are discharged in the closed state of the analog switches 213 and 223 is made far smaller.

In the head portion of (C) for obtaining the original reproduction signal after the passage of the portion for the minute defect, the output signal (b) of the first envelope detecting circuit 104 is started to return to a zero potential on the time constant substantially defined by the resistor 214 and the capacitor 212. At a time, the output signal (d) of the operating unit 106 lowers its signal level to the potential $V_e$ or less (E of FIG. 8). At this time, the output signal of the comparator 115 indicates a low level. Since the output signal of the comparator 115 indicates the low level, the analog switches 213 and 223 are made open and the overall circuit enters into the normal state.

In a case that the optical disk reproducing apparatus employs a system of dividing the optical disk into a plurality of blocks along the information tracks and recording data for each of the blocks, the reproduction signal converted into an electric signal by the reproduction head is an intermittent signal in each block. If the reproduction signal is intermittent, at the head portion of the reproduction signal, a sag takes place because of the AC coupling at the first stage shown in FIG. 7. Hence, any one of the first envelope detecting circuit 104 and the second envelope detecting circuit 105 abruptly rises or falls and the output signal (d) of the operating unit 106 abruptly rises or falls accordingly. When the output signal of the operating unit 106 reaches a predetermined potential $V_e$ or more ($-V_e$ or less), the output signal of the comparator 115 (116) is shifted to a high level so that the gate circuit 117 may output a pulse for closing the analog switches 213 and 223 even in the head portion of the reproduction signal. The circuit block 114 indicated by a broken line of FIG. 7 operates to generate a control signal for removing the pulse signal output from the gate circuit 117 in the head portion of the reproduction signal if the reproduction signal is intermittent. This embodiment has the circuit block 114 arranged like the embodiment shown in FIG. 5.

In an optical disk reproducing apparatus which is operated to obtain a serial reproduction signal given while the reproduction head moves along the information tracks, the foregoing description clearly indicates that the circuit block 114 and the gate circuit 118 are not necessary.

According to the operations of the above circuit components, the output signal of the operating unit 108 is indicated by a broken line of FIG. 8a. After the passage of a minute defective portion, the output signal swiftly follows the normal reproduction signal. The description will be oriented to a fifth embodiment of the present invention as referring to the drawings.

Figure 9:
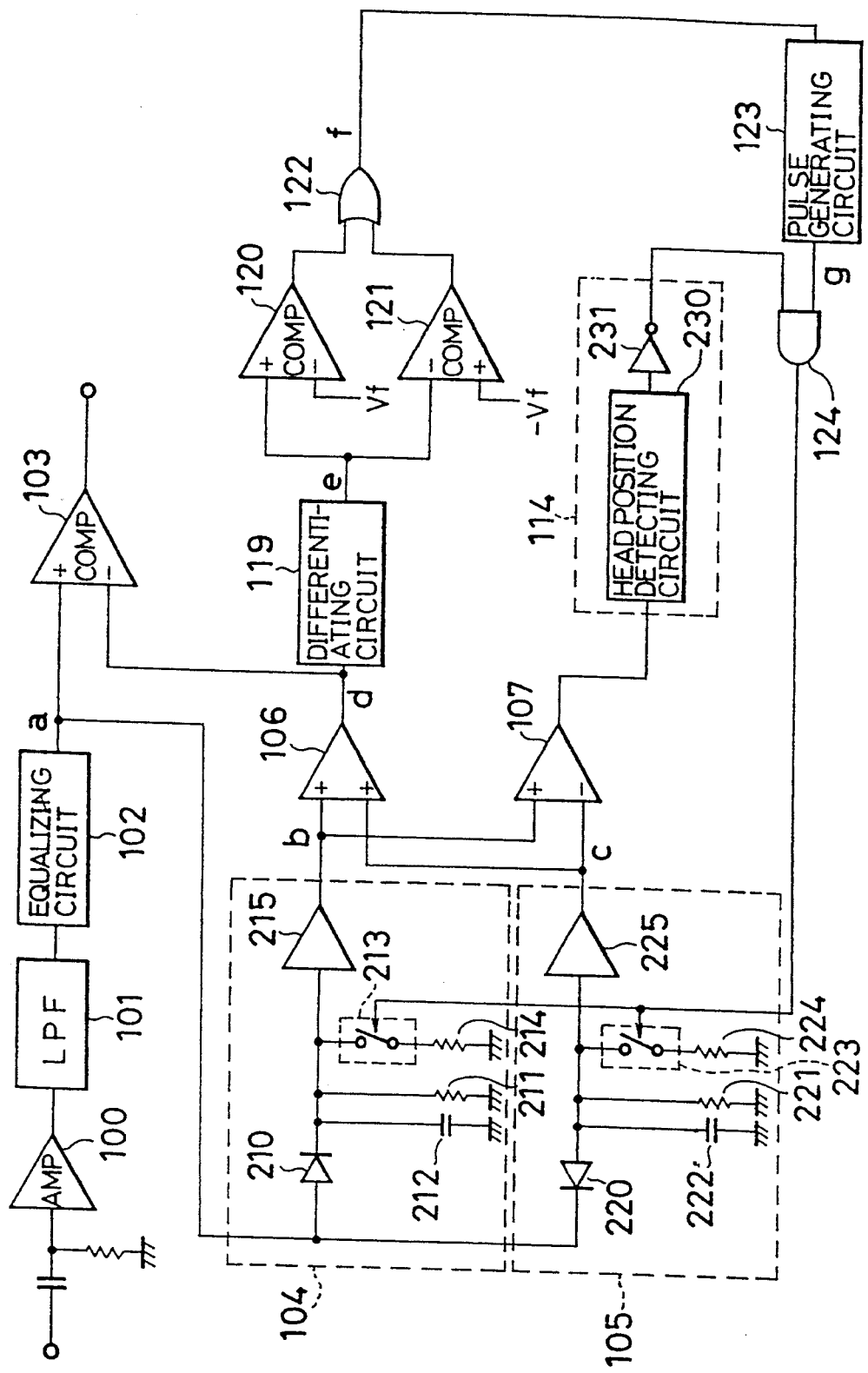
FIG. 9 is an electric circuit diagram showing a digital information reproducing apparatus according to a fifth embodiment of the present invention.

FIG. 9 is a block diagram showing a reproducing circuit included in an optical disk reproducing apparatus to which the present invention applies. The same components as those shown in FIGS. 1, 5 and 7 have the same reference numbers. In this embodiment, the output signal of the operating unit 106 is guided to one input terminals of the comparator 103 as well as the differentiating circuit 119 in which the signal is differentiated. The output signal of the differentiating circuit 119 are guided to one input terminal of the second comparators 120 and 121, The other input terminals of the comparators 121 and 121 are maintained at the potentials $V_f$ and $-V_f$, respectively.

The output signals of the comparators 120 and 121 are made logical OR in the gate circuit 122 and the signal made logical OR is guided to the pulse generating circuit 123, The output signal of the pulse generating circuit 123 is led to the analog switches 213 and 223 through a gate circuit 124 for the purpose of opening and closing the analog switches 213 and 223. The pulse generating circuit 123 may be arranged of a retrigerable and monostable multi-vibrator, for example, like the foregoing embodiment. A circuit block 114 indicated by a broken line of FIG. 9 operates to generate a control signal for masking the output signal of the gate circuit 124.

In this arrangement, the differentiation of the output signal of the operating unit 106 stops the adverse effect of an envelope of the reproduction signal. In the optical disk unit, normally, a data train to be recorded is modulated by a modulator before recording it on an information track. In such a data modulation, the frequency band of the reproduction signal is limited so as to match to the frequency characteristic of the transmission path. This modulating system often includes relatively low frequency components. On the other hand, as shown in FIG. 9, such low frequency components are removed by the AC coupling at the first stage of the reproducing system. Hence, the variation of an envelope (variation corresponding to the low frequency components of a bit train to be recorded) takes place.

The operation of this arrangement will be discussed blow as referring to FIG. 10. Herein, it is assumed that the analog switches 213 and 223 are normally made open and the resistors have the relations of resistor 211>resistor 214 and resistor 221>resistor 224 and the circuit block 114 is normally kept at high level.

Figure 10A:
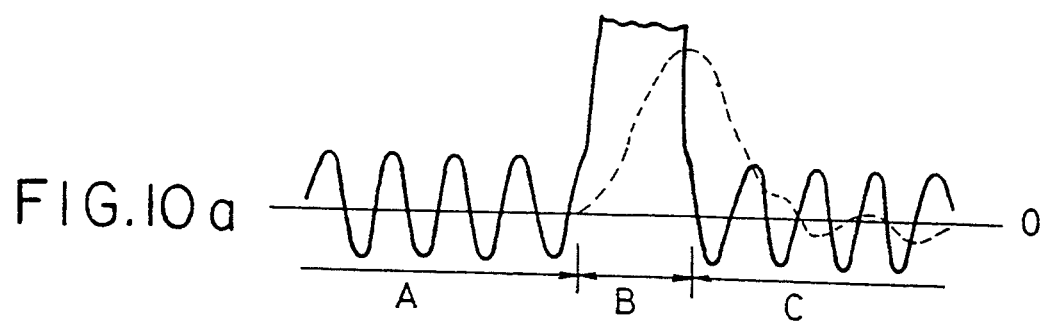
FIG. 10a–g depict waveforms for explaining the operation of the fifth embodiment.
Figure 10B:
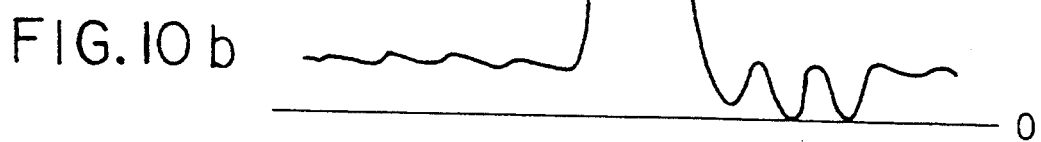
Figure 10C:
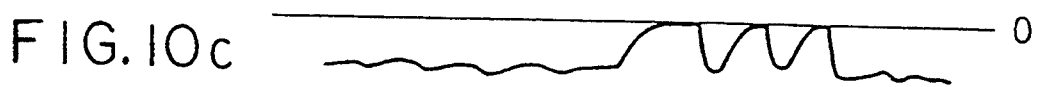
Figure 10D:
Figure 10E:
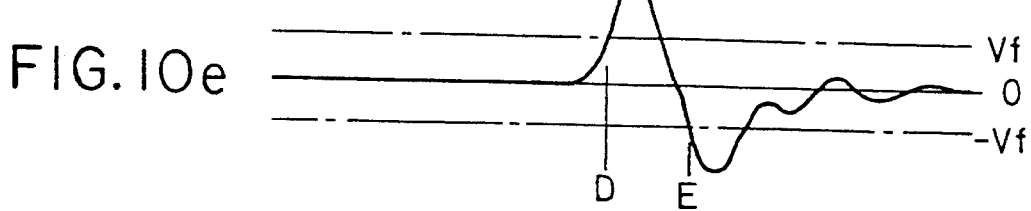
Figure 10F:
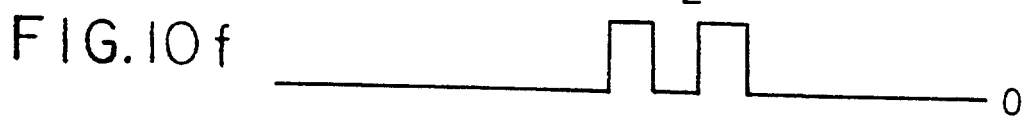
Figure 10G:
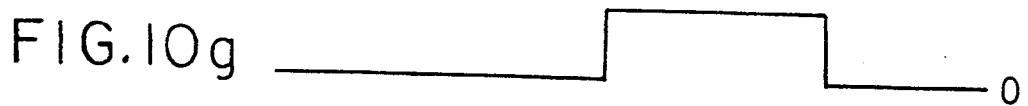

A real line shown by FIG. 10a indicates an output signal of the equalizing circuit 102. This is the same as that shown by FIG. 2a. With respect to this type of reproduction signal, the output signals of the first envelope detecting circuit 104 and the second envelope detecting circuit 105 are indicated by FIG. 10b and FIG. 10c, respectively. Further, the output signal of the operating unit 106 is indicated by FIG. 10d and the output signal of the differentiating circuit 119 is indicated by FIG. 10e. Moreover, the output signal of the gate circuit 122 is indicated by FIG. 10f and the output signal of the pulse generating circuit 123 is indicated by FIG. 10g.

The operations of the envelope detecting circuits 104 and 105 in the A portion of FIG. 10a are the same as that of the embodiment shown in FIGS. 1 and 2 (the output signals (b) and (c)).

In the leading edge of the B period corresponding to a successive minute defect, as indicated by the output signal (b), the output signal (b) of the first envelope detecting circuit 104 abruptly rises and the output signal (d) of the operating unit 106 rises accordingly. Hence, as indicated by the output signal (e), the output signal (e) of the differentiating circuit 119 changes according to the rise of the output signal of the operating unit 106 and keeps the signal level at the potential $V_f$ or higher (D of FIG. 10).

At this time, the output signal of the comparator 120 rises to a high level so that the pulse generating circuit 123 may output a pulse signal (g) having a predetermined time width. While the output signal of the pulse generating circuit 123 is at high level, the analog switches 213 and 223 are made closed so that the charges stored in the capacitor 212 (222) are discharged through the resistors 211 and 214 (221 and 224). Herein, by setting the resistance of the resistor 214 (224) to a far smaller value than that of the resistor 211 (221), like the foregoing embodiment, the time constant at which the charges stored in the capacitor 212 (222) are discharged when the analog switches 213 and 223 are made closed becomes far smaller.

Assuming that the width of a pulse output from the pulse generating circuit 123 is set to a larger value than the time length corresponding to a minute defective portion, in the head portion of C for obtaining an original reproduction signal after the passage of the portion for the minute defective portion, the output signal of the first envelope detecting circuit 104 is started to return to a zero potential with a time constant substantially defined by the resistor 214 and the capacitor 212, resulting in lowering the signal level of the output signal of the operating unit 106 accordingly. Hence, the output signal (e) of the differentiating circuit 119 changes according to the fall of the output signal of the operating unit 106 and keeps its signal level at the potential $-V_f$ or less (E of FIG. 10). At this time, the output signal of the comparator 121 rises to a high level so that the pulse generating circuit 123 may be restarred (output signals (f) and (g)).

By shifting the output signal of the pulse generating circuit 123 to a low level, the analog switches 213 and 223 are made open and the overall circuit enters into the normal state.

Herein, the arrangement and the operation of the circuit block 114 are the same as that of the foregoing embodiment.

According to the operations of the foregoing circuit components, the output signal of the operating unit 106 is indicated by a broken line of the signal (FIG. 10a) and swiftly follows the normal reproduction signal after the passage of the minute defective portion.

According to the present invention, in a peak portion of the envelope caused by a defect or the like, by switching the time constant on at which the charges stored in the capacitor of the envelope detecting circuit are discharged, after the reproduction head passes the minute defective portion, it is possible to reduce the time taken in returning to the storage amount of charges corresponding to the amplitude of the original reproduction signal. Therefore, it is possible to prevent a burst-like data error from being caused by a minute defect.

According to the present invention, if an intermittent reproduction signal is input to the AC-coupling reproducing system, it is easier to detect the peak portion of the envelope caused by the minute defect.

According to the present invention, it is possible to reduce the adverse effect given by the variation of an amplitude level of the reproduction signal caused by some factors such as variation between disks, environmental conditions like a temperature, and unevenness of the recording and reproducing characteristics of a disk and easier to detect the peak portion of the envelope caused by a minute defect.

Further, according to the present invention, it is also possible to reduce the adverse effect given by the low frequency components lost by the AC-coupled reproducing circuit system and easier to detect the peak portion of the envelope.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital information reproducing apparatus, comprising:
   readout means for reproducing information recorded on tracks of a recording medium by scanning a track of said recording medium;
   a first envelope detecting circuit for detecting an envelope of one polarity contained in a reproduction signal sent from said readout means, said first envelope detecting circuit including a variable time constant circuit for generating the envelope signal from the reproduction signal in one polarity;
   a second envelope detecting circuit for detecting an envelope of the other polarity contained in said reproduction signal, said second envelope detecting circuit including another variable time constant circuit for generating the envelope signal from the reproduction signal in the other polarity;
   an adding circuit for obtaining a sum signal of outputs of said first and second envelope detecting circuits;

a first comparator for comparing said reproduction signal with said sum signal;

a subtracting circuit for obtaining a difference signal between the outputs of said first and second envelope detecting circuits; and a time constant controlling means for varying time constants of said time constant circuits, based on said difference signal.

2. A digital information reproducing apparatus as claimed in claim 1, wherein said time constant controlling means includes a second comparator for comparing said difference signal with a signal of a predetermined level; and a switching circuit for switching time constants of said time constant circuits provided in said first and second envelope detecting circuits, based on an output signal of said second comparator.

3. A digital information reproducing apparatus as claimed in claim 2, further comprising a pulse generating circuit for generating a control signal for switching time constants of said time constant circuits, based on the output signal of the second comparator.

4. A digital information reproducing apparatus as claimed in claim 3, wherein said pulse generating circuit includes a refriger-able and monostable multi-vibrator which operates at the leading portion of the input signal.

5. A digital information reproducing apparatus as claimed in claim 1, wherein said time constant controlling means includes a differentiating circuit for differentiating said difference signal; and a switching circuit for switching time constants of said time constant circuits provided in said first and second envelope detecting circuits, based on an output signal of said differentiating circuit.

6. A digital information reproducing apparatus, comprising:

readout means for reproducing information recorded on tracks of a recording medium by scanning a track of said recording medium;

a first envelope detecting circuit for detecting an envelope of one polarity contained in a reproduction signal sent from said readout means, said first envelope detecting circuit including a variable time constant circuit for generating the envelope signal from the reproduction signal in one polarity;

a second envelope detecting circuit for detecting an envelope of the other polarity contained in said reproduction signal, said second envelope detecting circuit including another variable time constant circuit for generating the envelope signal from the reproduction signal in the other polarity;

an adding circuit for obtaining a sum signal of outputs of said first and second :envelope detecting circuits;

a first comparator for comparing said reproduction signal with said sum signal; and a time constant controlling means for varying time constants of said time constant circuits, based on said sum signal.

7. A digital information reproducing apparatus as claimed in claim 8, wherein said time constant controlling means includes a second comparator for comparing said sum signal with a signal of a predetermined level; and a switching circuit for switching time constants of said time constant circuits provided in said first and second envelope detecting circuits, based on an output signal of said second comparator.

8. A digital information reproducing apparatus as claimed in claim 7, further comprising a pulse generating circuit for generating a control signal for switching time constants of said time constant circuits, based on the output signal of the second comparator.

9. A digital information reproducing apparatus as claimed in claim 8, wherein said pulse generating circuit includes a retriger-able and monostable multi-vibrator which operates at the leading portion of the input signal.

10. A digital information reproducing apparatus as claimed in claim 6, wherein said time constant controlling means includes a differentiating circuit for differentiating said sum signal; and a switching circuit for switching time constants of said time constant circuits provided in said first and second envelope detecting circuits, based on an output signal of said differentiating circuit.

* * * * *

UNITED STATES PATENT AND TRADEMARK OFFICE
CERTIFICATE OF CORRECTION

PATENT NO. : 5,377,054
DATED : Dec. 27, 1994
INVENTOR(S) : Yamaguchi et al.

It is certified that error appears in the above-identified patent and that said Letters Patent is hereby corrected as shown below:

Column 16, line 18, change "8" to --6--.

Signed and Sealed this

Twenty-first Day of March, 1995

Attest:

BRUCE LEHMAN

*Attesting Officer*          *Commissioner of Patents and Trademarks*